Feb. 28, 1956　　　　H. S. GIPE　　　　2,736,276
PRETZEL TWISTING MACHINE
Original Filed March 18, 1947　　　　8 Sheets-Sheet 1

INVENTOR.
HARRISON S. GIPE
BY *Popps and Bruns*

HIS ATTORNEYS.

Feb. 28, 1956  H. S. GIPE  2,736,276
PRETZEL TWISTING MACHINE
Original Filed March 18, 1947  8 Sheets-Sheet 2

INVENTOR.
HARRISON S. GIPE
BY *Popps and Bruns*
HIS ATTORNEYS.

Feb. 28, 1956 H. S. GIPE 2,736,276
PRETZEL TWISTING MACHINE
Original Filed March 18, 1947 8 Sheets-Sheet 3

INVENTOR.
HARRISON S. GIPE
BY
HIS ATTORNEYS.

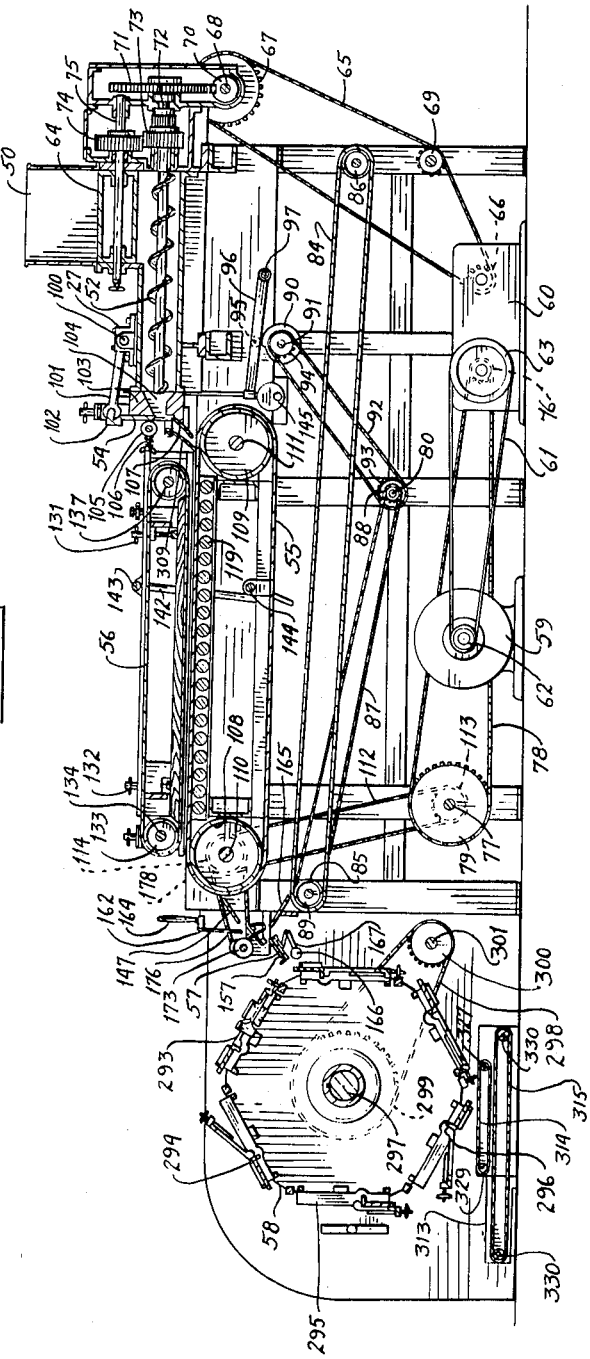

Feb. 28, 1956          H. S. GIPE          2,736,276
PRETZEL TWISTING MACHINE
Original Filed March 18, 1947          8 Sheets-Sheet 5
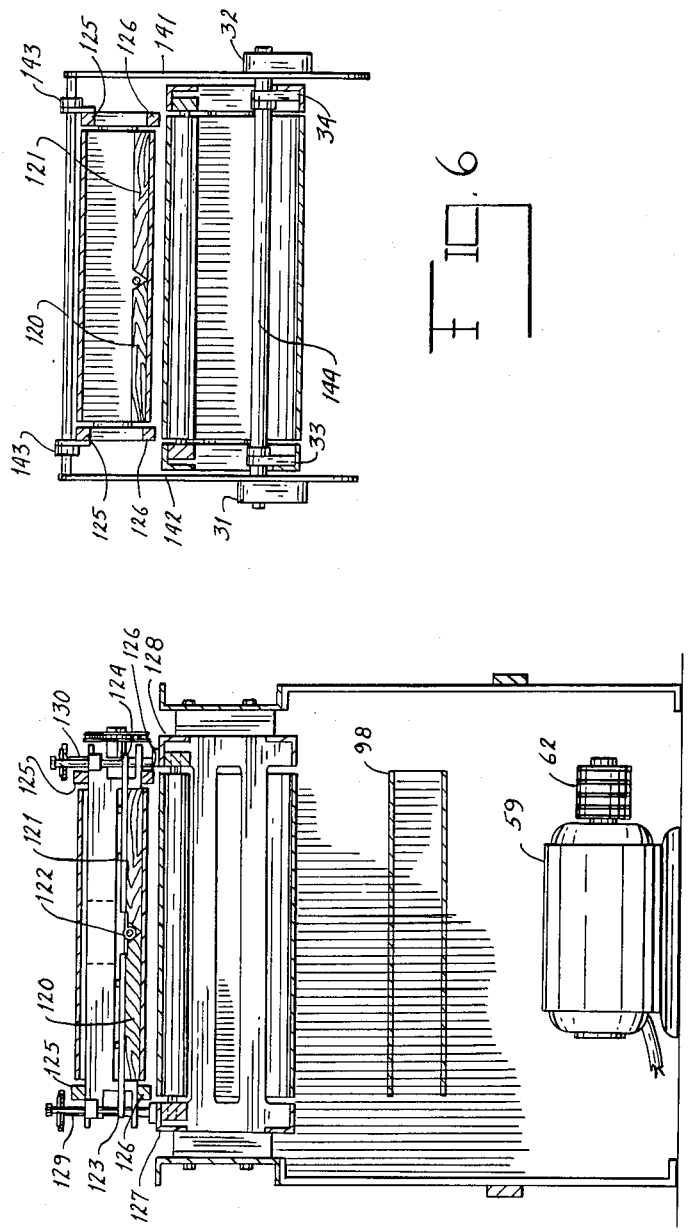
INVENTOR.
HARRISON S. GIPE
BY
HIS ATTORNEYS.

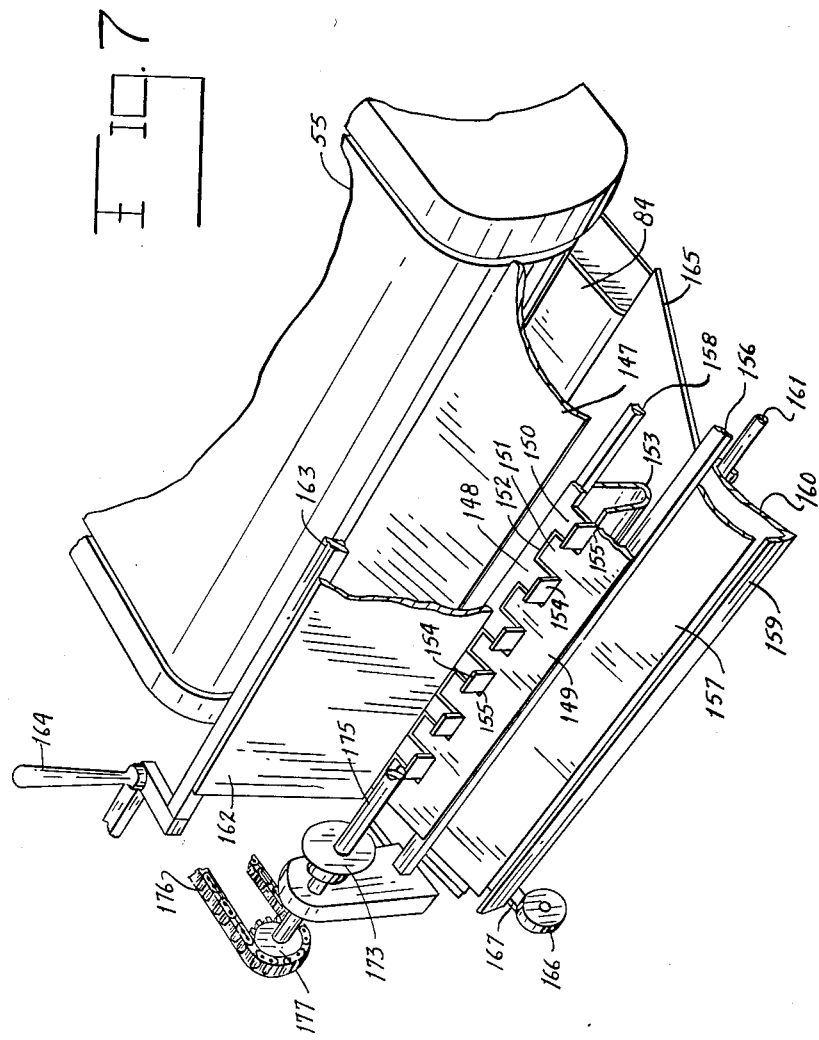

Feb. 28, 1956  H. S. GIPE  2,736,276
PRETZEL TWISTING MACHINE
Original Filed March 18, 1947  8 Sheets-Sheet 7
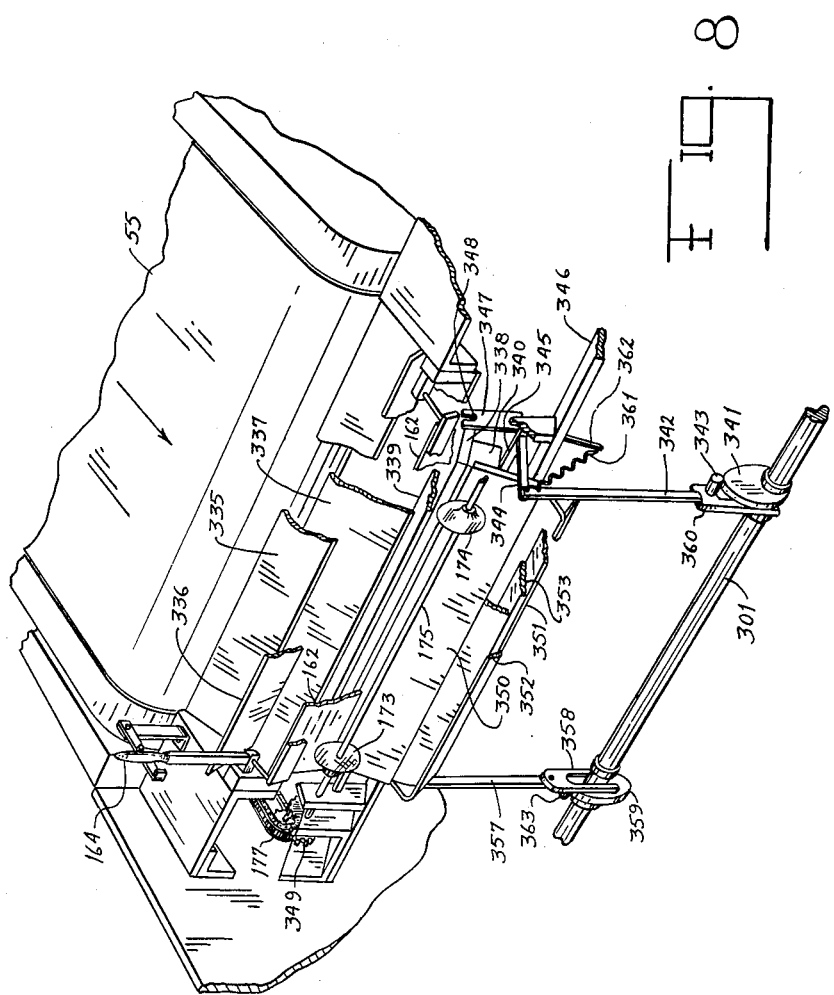
INVENTOR.
HARRISON S. GIPE
BY *Popp and Brune*
HIS ATTORNEYS.

Feb. 28, 1956 H. S. GIPE 2,736,276
PRETZEL TWISTING MACHINE
Original Filed March 18, 1947 8 Sheets-Sheet 8
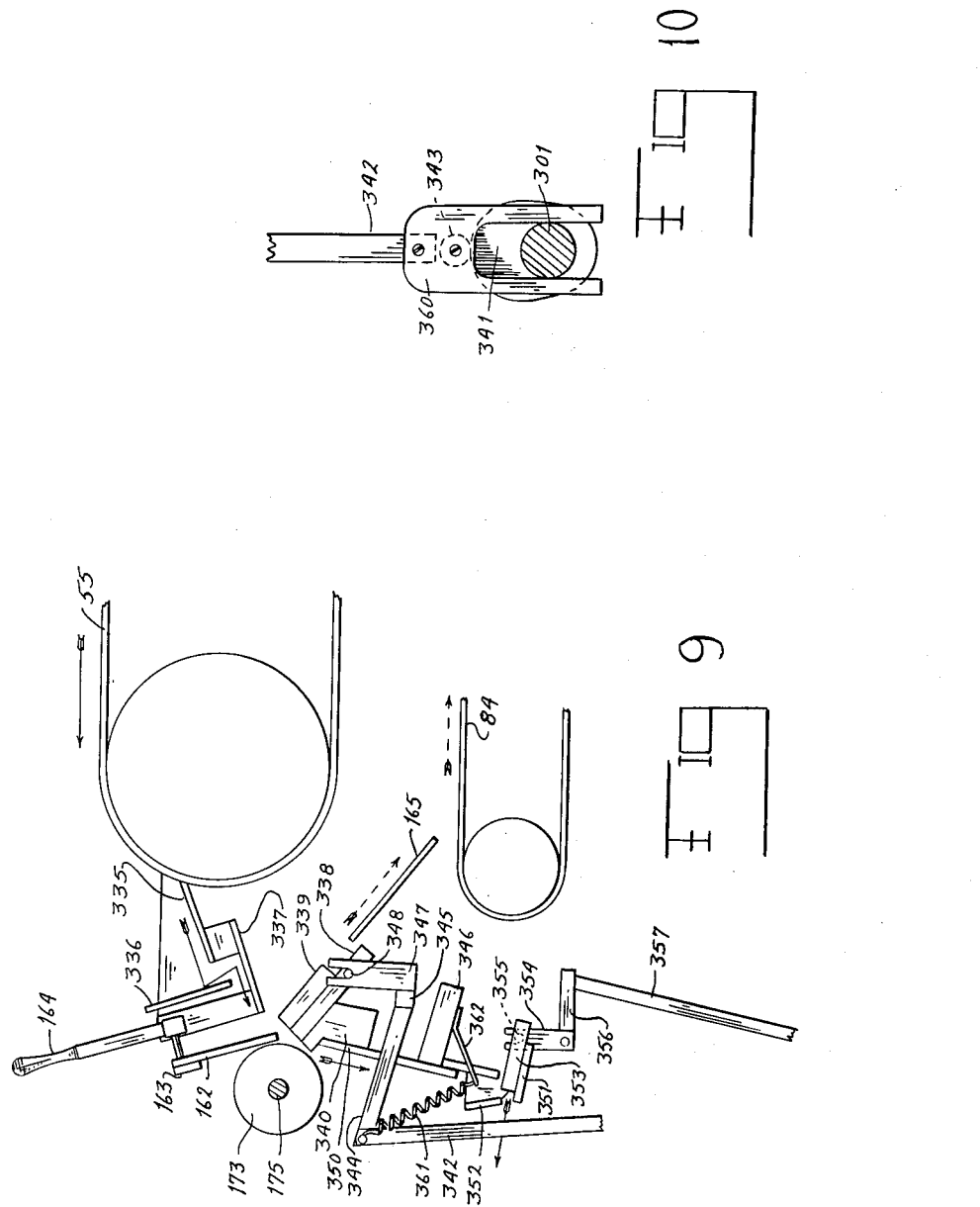
INVENTOR.
HARRISON S. GIPE
BY
HIS ATTORNEYS.

United States Patent Office 2,736,276
Patented Feb. 28, 1956

2,736,276

PRETZEL TWISTING MACHINE

Harrison S. Gipe, Reading, Pa., assignor to Quinlan Pretzel Company, Inc., Reading, Pa., a corporation of Pennsylvania Original application March 18, 1947, Serial No. 735,422, now Patent No. 2,628,577, dated February 17, 1953. Divided and this application December 4, 1951, Serial No. 259,838

13 Claims. (Cl. 107—8)

This invention relates to pretzel twisting machinery and this application is a division of the co-pending application of Harrison S. Gipe, Serial Number 735,422, filed March 18, 1947, now Patent No. 2,628,577, dated February 17, 1953, and entitled "Pretzel Twisting Machine."

In pretzel twisting machines of the type with which this invention is concerned, pieces or masses of dough are placed in a hopper having feed rollers at the bottom thereof. These feed rollers force the dough onto a pair of worms which extrude the dough through an orifice. As the dough is extruded, individual pieces are cut off and these pieces are rolled into long strips.

Each of these long strips of dough must be accurately trimmed to proper length and delivered to a forming unit on a drum. The invention of this application is concerned primarily with the mechanism which trims the dough strips and transfers them to the forming units on the drum.

The invention has as its foremost objective the provision of new and improved trimming and transfer mechanism which will take dough strips from the rolling aprons, trim the ends to impart a required predetermined length thereto and then deliver the trimmed strips to the forming units of the drum.

Various other more detailed objects and advantages of the invention such as arise in connection with carrying out the above noted ideas in a practical embodiment will in part become apparent and in part be hereinafter stated as the description of the invention proceeds.

The invention, therefore, comprises new and improved trimming and transfer mechanism for a pretzel twisting machine and which mechanism is designed to trim strips of dough to a proper length and transfer each strip to a forming unit on a drum.

For a full and more complete understanding of the invention, reference may be had to the following description and accompanying drawings wherein:

Figure 4 is a longitudinal section through the machine illustrating the relative positions of the parts.

Figure 5 is a cross-section through the machine on line 5—5 of Figure 1, illustrating the construction of the conveyors, and showing the motor with the belts, chains, and other parts omitted.

Figure 6 is a cross-section through the conveyors on line 6—6 of Figure 1 showing levers mounted on the lower conveyor frame for raising and lowering the upper conveyor assembly.

Figure 7 is a view illustrating the relative positions of the parts of the feeders that receive the products from the conveyors and feed them to the jigs on the forming and twisting drum.

Figure 8 is a perspective view illustrating the relative positions of the parts of a modified form of the feeder shown in Figure 7.

Figure 9 is a diagrammatical side elevation of the feeder illustrated in Figure 8.

Figure 10 is a sectional side elevation illustrating the structure for connecting the actuating arms of the feeder to a rotating shaft.

Figure 1:
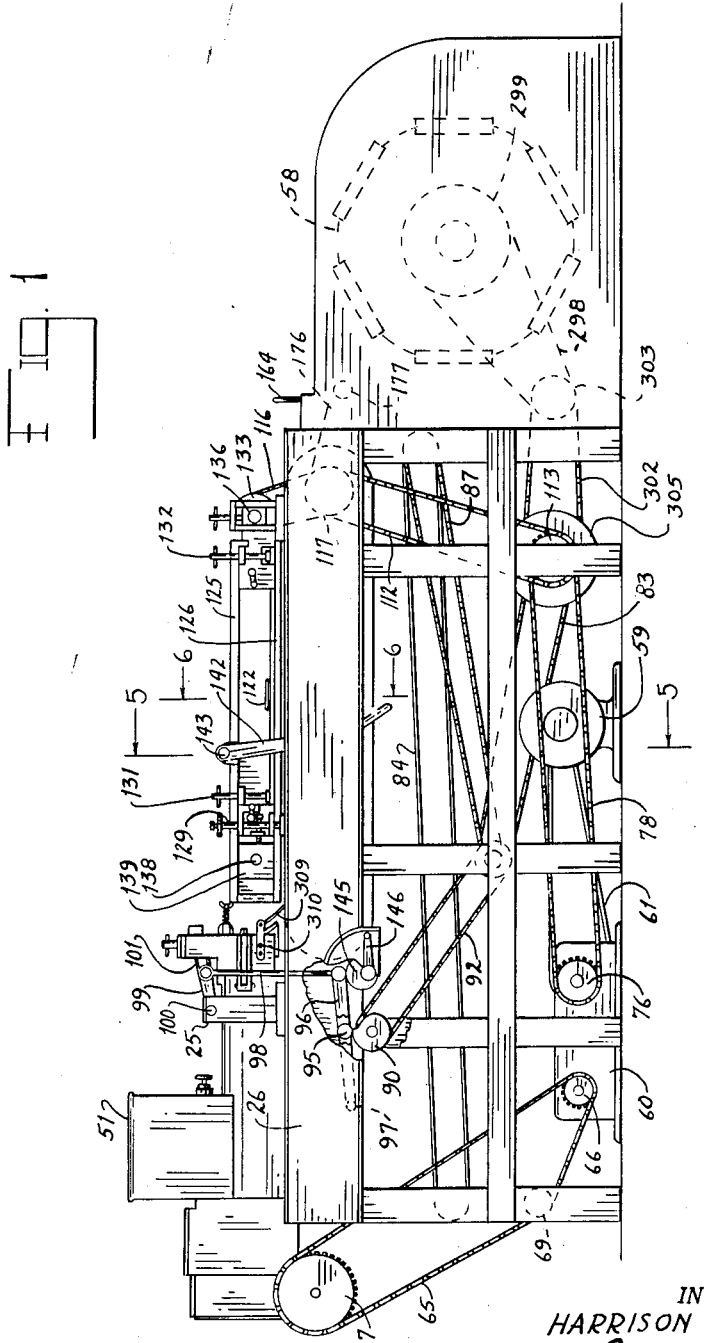
Figure 1 is a view showing a side elevation of the machine with part of one of the side beams broken away showing a cam for actuating a reciprocating knife with adjusting means associated therewith.
Figure 2:
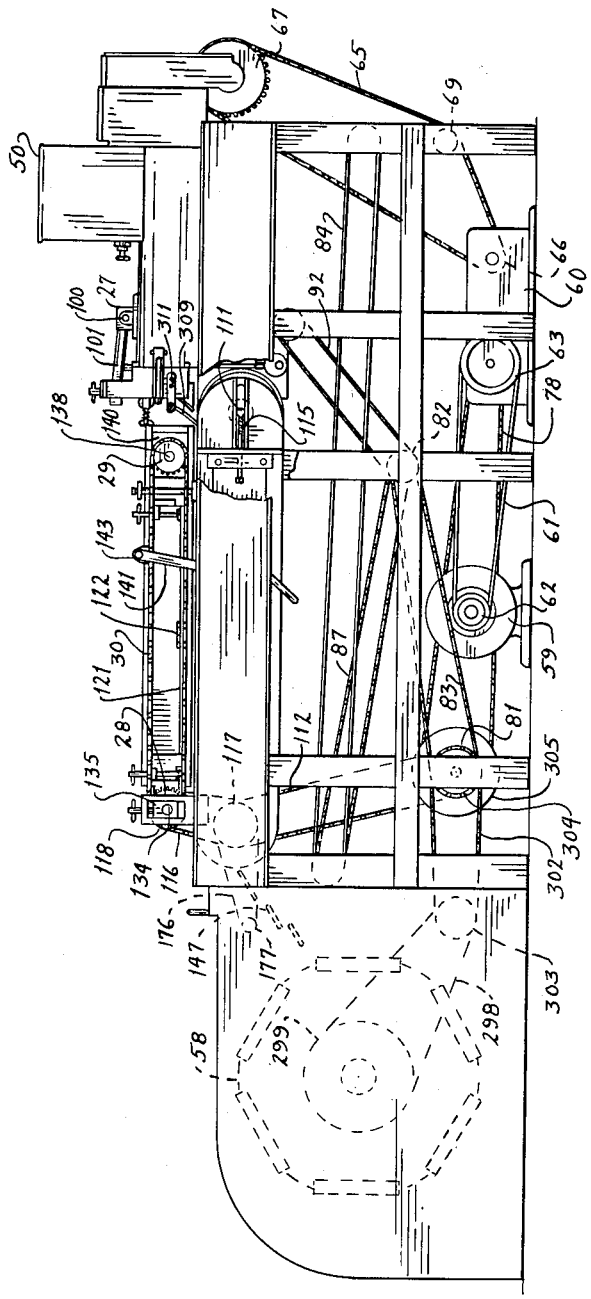
Figure 2 is a view showing a side elevation looking toward the opposite side of the machine; also with part of a side beam broken away, illustrating a take-up device for adjusting the main conveyor.
Figure 3:
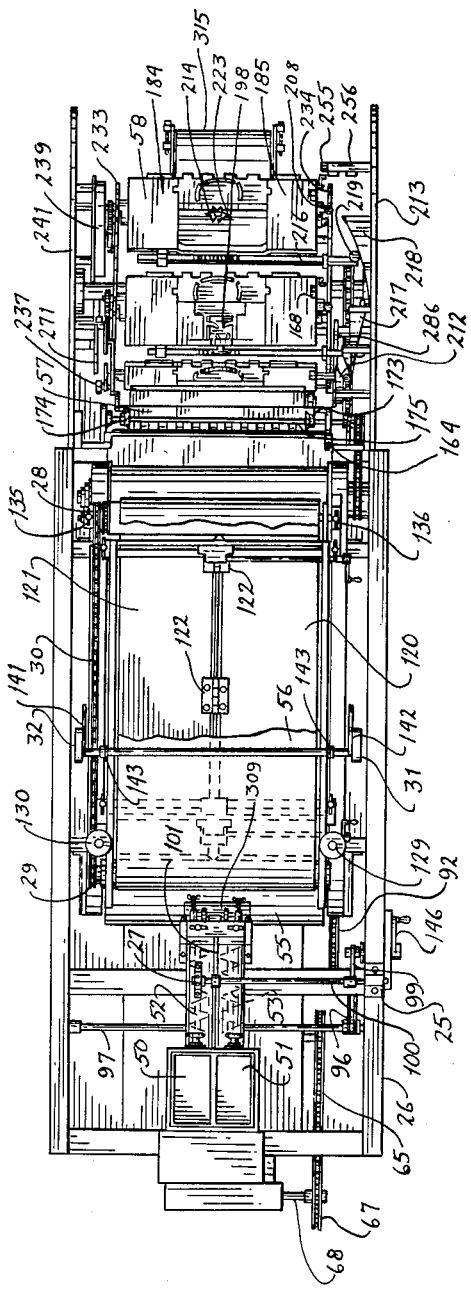
Figure 3 is a plan view of the machine with part of the upper section of the upper conveyor belt broken away showing the hinged platform therein.

Referring now to the drawings, wherein like reference characters denote corresponding parts, the pretzel forming and twisting machine of this invention includes supply hoppers 50 and 51, twin screw feeding conveyors 52 and 53, a reciprocating knife 54, a main conveyor 55, a coacting superimposed conveyor 56, a feeder 57, and a forming and twisting drum 58.

In the design shown, the machine is operated by a motor 59 which drives a reduction gear 60 through a belt 61 on pulleys 62 and 63. The reduction gear drives the hopper feeder 64 and screw conveyors 52 and 53 through a chain 65 from a sprocket 66, which drives a sprocket 67 on a shaft 68, the chain 65 traveling over a take-up idler 69. A worm gear 70 on the shaft 68 meshes with a gear 71 on the shaft 72 of the screw conveyor 52, and the shaft 72 is provided with a gear 73 that meshes with a similar gear on the shaft of the screw conveyor 53 and also with a gear 74 on the shaft 75 of the hopper feeder 64.

The reduction gear 60 is also provided with a sprocket 76 that drives a main drive shaft 77 through a chain 78 and a sprocket 79, and the shaft 77 drives a jack shaft 80 through sprockets 81 and 82 and a chain 83. The jack shaft 80 drives a return conveyor 84 having pulleys 85 and 86 at the opposite ends thereof, by a chain 87 and sprockets 88 and 89, as shown in Figure 4. The jack shaft also drives a cam 90 on a shaft 91 through a chain 92 and sprockets 93 and 94, and the surface of the cam engages a roller 95 between a pair of arms 96 that are pivotally mounted at one end on a shaft 97. The opposite ends of the arms 96 are connected by a rod 98 to an arm 99, pivotally mounted at one end on a shaft 100. The shaft 100 is retained in a bearing 25 mounted on a channel member 26 and a bearing 27 mounted over the screw feeding conveyor 52. Congruent with the center line of the knife 54, an arm 101 is pivotally mounted on the shaft 100, and the opposite end of the arm 101 is in engagement with an upper bar 102 of the knife 54.

The knife is resiliently urged against a block 103 having an outlet orifice 104 therein by a roller 105 with a spring 106 associated therewith, and after being cut, the strips of material drop downward over a guide 107 to the main conveyor 55. To aid in placing the dough strips on the main conveyor 55, a fabric baffle 309 is draped transversely forward of the outlet orifice 104 and is held extended over the guide 107 by arms 310 and 311. The arms 310 and 311 are attached at one end to the block 103 and support at the opposite end a dowel 312 on which the fabric baffle 309 is mounted.

The conveyor 55 comprises an endless belt having head and tail pulleys 108 and 109 respectively, the head pulley being mounted on a shaft 110 and the tail pulley mounted on a shaft 111. The conveyor is driven through the head pulley by a chain 112 from the main drive shaft 77 with the chain traveling over sprockets 113 and 114. The ends of the shaft 111 of the tail pulley are mounted in take-up bearings 115, wherein slack may be taken up in the conveyor belt. The superimposed conveyor 56 also comprises an endless belt with the under surface spaced sufficiently above the upper surface of the belt 55 to permit rolls of material of predetermined size to roll therethrough. The conveyor 56 is driven by a chain 116 on pulleys 117 and 118, and it will be noted that the driven pulley 118 is of a smaller diameter than the pulley 117, wherein the pulley 118, and consequently the belt of the conveyor 56, will travel faster than the belt of the conveyor 55 so that rolling action will take place, and the material will be rolled as it passes along the conveyors.

The upper section of the belt of the conveyor 55 is supported on transversely disposed idler rollers 119, and the lower section of the belt of the upper conveyor 56 is held downward by hinged platforms 120 and 121 divided longitudinally at the center and connected by hinges 122. The sections of the platform are provided with outwardly extending handles 123 and 124, and the conveyor is mounted in side bars 125 and 126 which are adjustably suspended above side rails 127 and 128 of the main conveyor frame by adjusting screws 129 and 130. The elevation of the sections 120 and 121 of the platform is also adjusted by adjusting screws 131 at one end and 132 at the other. The sprocket 118 which drives the head pulley 133 of the conveyor 56 is mounted on a shaft 135, the ends of which are held in adjusting bearings 135 and 136, wherein the end of the conveyor may be adjusted in elevation in relation to the conveyor 55. A tail pulley 137 at the opposite end of the conveyor 56 is mounted on a shaft 138 that is held in take-up bearings 139 and 140. A sprocket 28 is mounted next to the sprocket 118 on the shaft 134, and is connected to a sprocket 29 on the shaft 138 of the tail pulley 137 by a chain 30 to promote even distribution of power.

The upper conveyor 56 is, therefore, substantially floating in that either end or any part thereof may be elevated or lowered to maintain operative relation therewith of the lower conveyor 55. The conveyor 56 is also provided with lifting means in the form of depending arms 141 and 142 pivotally mounted in bearings 143, and positioned to be attached to arms 31 and 32 which are pivotally mounted on a shaft 144 which is retained in bearings 33 and 34 secured to the lower section of the conveyor 55.

The reciprocating action of the knife 54 is also adjustable through an eccentric cam 145 actuated by an arm 146, as shown in Figure 1, wherein with the eccentric cam 145 positioned under the end of the arm 96, downward movement of the rod 98 and, therefore, of the knife may be controlled.

With the machine operating, dough is placed in the hoppers 50 and 51 and fed by the rollers 64 to the screw conveyors 52 and 53 by which it is supplied to the reciprocating knife 54 which cuts the dough into elongated strips that pass down the chute 107 to the conveyor belt 55. The dough strips are carried between the conveyors 55 and 56, and with the conveyor 56 traveling at a higher speed than the conveyor 55, the strips are rolled, providing round strips that drop by gravity from the belt of the conveyor 55 upon the apron 147, as illustrated in Figure 7. From the apron 147, the dough strips roll to the plates 148 and 149, the adjoining edges of which are provided with meshing fingers 150 and 151, the fingers 151 dovetailing in slots 152 between the fingers 150. Thus members 148 and 149 are intercalated and form a plate for receiving dough from apron 147. The plate 148 is a receiving plate for receiving the strips from apron 147 and integrally therewith is a U-shaped support 153 having projecting arresting fingers 154 on one edge thereof that extend upwardly through notches 155 between the fingers 151 and are held on a bar 158. Plate 149 is a delivery plate for delivering the strips to baffle plate 157. Plates 148 and 149 form a single plate like construction when they are horizontally aligned. The fingers 154 extend outward from the surface of the plate 149 between the ends of the fingers 150 and the inner ends of the notches 155, providing means for stopping the dough strips. These fingers 154 arrest the progress of the dough strips to give both ends of the strips an opportunity to catch up, in the event they are not delivered from the conveyor 55 absolutely even or in a transverse position. The dough strips remain against the fingers 154 until the plate 149 is actuated by the bar 156 upon which the plate 149 is mounted, so that the plate 149 moves upward through the slots, and thereby releases the dough strips which roll from the plate 149 to a baffle 157. At the lower edge of the baffle 157, the dough strips engage a flange 159 of an L-shaped plate 160, which is supported on a bar 161.

Above the plates 148 and 149 is a substantially vertical baffle 162 suspended from a bar 163, and the baffle 162 may be actuated by a handle 164 to arrest and divert culls backward upon an apron 165 by which they are delivered to a return conveyor 84 positioned below the main conveyor 55. The baffle 162 may also be used to return dough strips to the opposite end of the machine if, for any reason, it should not be desired to deliver the dough strips to the forming unit 58.

From the flange 159 of the plate 160, the dough strips are picked up by the forming units in which they are formed and twisted to form pretzels.

To release the dough strips from the flange 159, a roller 166 connected to the bar 161 by a knee joint 167 is engaged by a hook on the end of the forming unit which moves the flange downward whereby the dough strip is free to roll from the baffle 157 so that it may be picked up by the fingers of a forming unit. At the same time, the bar 156 is actuated and the plate 149 is swung upward to release another dough strip from the fingers 154 in which position the ends of the strips are trimmed evenly by rotary knives 173 and 174 on a shaft 175 which is rotated from the head shaft 110 of the conveyor 55 through a chain 176 and sprockets 177 and 178.

A modified form of the feeding mechanism which directs the dough from the main conveyor 55 to the forming units is illustrated in Figure 8. In the modified form of the feeding mechanism, a transverse inclined plate 335 removes the dough strips from the main conveyor 55. The dough strips with the velocity imparted to them by the conveyor 55 strike a second plate 336 which is substantially forward of and perpendicular to the inclined plate 335. Striking the plate 336, the lagging ends of the dough strips are brought in line and the straightened strips of dough rebound to a second inclined plate 337 which is below and forward of the first inclined plate 335. At this point the dough strips may be redirected to a return conveyor, as was described in the original feeder; however, if the machine continues to operate normally, the dough strip rolls by gravity from the second inclined plate 337 onto a pusher element 338, which is mounted to push at an elevated angle. The pusher element is retained between an upper bearing plate 339 and a lower bearing 340, and is actuated by a cam 341 mounted on the shaft 301. To actuate the pusher element 338 from the cam 341, an arm 342 is held to the shaft 301 by a forked joint 360 which saddles the shaft 301 and carries a roller 343 which rides on the cam 341. The upper end of the arm 342 is pivotally attached to a bar 344 which in turn is attached to a square shaft 345. The lower end of a plate 347 is mounted on the shaft 345 and the upper end is forked and constructed to saddle a pin 348 which is retained in the pusher element 338, thereby allowing the cam 341 to slide the pusher element 338 back and forth. A coil spring 361 is attached between the joint of the bar 344 and the arm 342 to an extension 362 which is fixedly secured to a permanent bracket 346, thereby giving assurance that the arm 342 will be drawn down at the proper time.

When the pusher element 338 pushes the dough strips outwardly, the ends of the strips are trimmed evenly by rotary knives 173 and 174 on a shaft 175 which is the same as the cutting device described originally. The shaft 175 of the knives 173 and 174 can be actuated by the sprocket 177 through reduction gears 349.

The dough strips, after being trimmed by the knives 173 and 174, roll down a plate 350 and come to rest on a horizontal plate 351. The strips are kept from bouncing from the plate 351 by a plate 352 which forms an acute angle with the plate 350 forming thereby a trough with a transverse opening in its lower edge. This is more easily seen in Figure 9 in which the solid arrows indicate the path of the dough in normal operation and the dotted arrows indicate redirected dough. As the dough strips come to rest at the bottom of the trough, a pusher 353 which rides on the bottom horizontal plate 351 pushes the dough strip through the transverse opening in the bottom of the trough, and since the pusher 353 works in timed relation with the drum carrying the forming units, the strip leaves the plate 351 to meet a pretzel forming die.

The pusher 353, similar to the pusher element 338, is actuated by a cam on the shaft 301. A plate 354 with a forked end saddles a pin 355 retained in the pusher 353. The lower end of the plate 354 is attached to a bar 356 which is attached to an arm 357. The lower end of the arm 357 is fixed to a forked joint 358 which grips the shaft 301. A roller 363 on the joint 358 rides on a cam 359 which actuates the pusher. While the pushers 353 and 338 are similarly actuated, they are opposite in action; therefore, the cams are adjusted to move the pushers 353 and 338 in opposite relation.

While preferred specific embodiments of the invention are hereinbefore set forth, it is to be clearly understood that the invention is not to be limited to the exact constructions, mechanisms and devices illustrated and described because various modifications of these details may be provided in putting the invention into practice within the purview of the appended claims.

What is claimed is:

1. In a pretzel twisting machine, a feeder for transferring straight strips of dough to a twisting mechanism, said feeder comprising: an inclined plate receiving dough strips, a receiving plate disposed beneath the lower edge of said inclined plate and having a plurality of fingers along one edge defined by notches between the fingers, abutment means at the free ends of each of said fingers, a pivotally mounted delivery plate having fingers received in said notches and which fingers are spaced apart by notches receiving the fingers on said receiving plate and the abutment means, and means for rotating said delivery plate to cause the fingers thereon to remove pretzels from the receiving plate over said abutment means.

2. In a pretzel twisting machine, a feeder for transferring straight strips of dough to a twisting mechanism, said feeded comprising: an inclined plate receiving dough strips, a fixed receiving plate beneath the lower edge of said inclined plate having fingers on its free edge, a pivotally mounted delivery plate having fingers intermeshing with the fingers on said receiving plate, abutment members at the free ends of the fingers on said receiving plate, cam means for rotating said delivery plate, a second inclined plate receiving dough strips from said delivery plate, and an L-shaped plate beneath said second inclined plate receiving dough strips therefrom.

3. In a pretzel twisting machine, a feeder for transferring straight strips of dough to a twisting mechanism, said feeder comprising: an inclined plate receiving dough strips, a receiving plate disposed beneath the lower edge of said inclined plate and having a plurality of fingers along one edge defined by notches between the fingers, abutment means at the free ends of each of said fingers, a pivotally mounted delivery plate having fingers received in said notches and which fingers are spaced apart by notches receiving the fingers on said receiving plate and the abutment means, and rotary cutting elements positioned above said intermeshing fingers to trim the ends of dough strips as they are moved by said delivery plate.

4. In a pretzel twisting machine, a feeder for transferring straight strips of dough to a twisting mechanism, said feeder comprising: an inclined plate receiving dough strips, a baffle plate spaced from the lower edge of said inclined plate and substantially normal thereto, a second inclined plate positioned beneath said first inclined plate and said baffle plate for receiving dough strips therefrom, a pusher plate for receiving dough strips from said second inclined plate, and means for actuating said pusher plate to deliver the strips from the pusher plate to said twisting mechanism.

5. In a pretzel twisting machine, a feeder for transferring straight strips of dough to a twisting mechanism, said feeder comprising: an inclined plate receiving dough strips, a baffle plate spaced from the lower edge of said inclined plate and substantially normal thereto, a second inclined plate positioned beneath said first inclined plate and said baffle plate for receiving dough strips therefrom, a pusher plate for receiving dough strips from said second inclined plate, and rotary cutting elements for trimming the ends of dough strips as they are moved by said pusher plate.

6. In a pretzel twisting machine, a feeder for transferring straight strips of dough to a twisting mechanism, said feeder comprising: an inclined plate receiving dough strips, a baffle plate spaced from the lower edge of said inclined plate and substantially normal thereto, a second inclined plate positioned beneath said first inclined plate and said baffle plate for receiving dough strips therefrom, a pusher plate for receiving dough strips from said second inclined plate, a third inclined plate receiving dough strips from said pusher plate, and baffle means at the lower edge of said third inclined plate.

7. In a pretzel twisting machine, a feeder for transferring straight strips of dough to a twisting mechanism, said feeder comprising: an inclined plate receiving dough strips, a baffle plate spaced from the lower edge of said inclined plate and substantially normal thereto, a second inclined plate positioned beneath said first inclined plate and said baffle plate for receiving dough strips therefrom, a pusher plate for receiving dough strips from said second inclined plate, a third inclined plate receiving dough strips from said pusher plate, a horizontal plate beneath the lower edge of said third inclined plate receiving dough strips therefrom, a second pusher plate slidably mounted on said horizontal plate, and means for actuating said second pusher plate.

8. In a pretzel twisting machine, a feeder for transferring straight strips of dough to a twisting mechanism, said feeder comprising: an inclined plate initially receiving the straight dough strips, a receiving plate adjacent to and below said inclined plate and having a plurality of fingers arranged in a straight line across said receiving plate and projecting above said receiving plate which engage and straighten said dough strips as they are received from the inclined plate, and means cooperating with said receiving plate for delivering the said dough strips from the receiving plate to said twisting mechanism comprising a delivery plate receiving said fingers and portions of said receiving plate, said strips resting on both said portions of said receiving plate and said delivery plate when in engagement with said fingers, said delivery plate being movable away from said fingers to remove said strips from contact with said fingers, means for moving said delivery plate away from said fingers.

9. In a pretzel twisting machine, a feeder for transferring straight strips of dough to a twisting mechanism, said feeder comprising: an inclined plate for receiving dough strips, a receiving plate adjacent to and below said inclined plate and having a plurality of fingers integrally connected thereto so as to lie in a substantially perpendicular relationship to said receiving plate, the said fingers being arranged in a straight line across said receiving plate and projecting above said receiving plate for engaging and straightening said dough strips as they are received from the inclined plate, means cooperating with said receiving plate for delivering the dough strips from the receiving plate to said twisting mechanism comprising a delivery plate receiving said fingers and portions of said receiving plate, said strips resting on both said portions of said receiving plate and said delivery plate when in engagement with said fingers, said delivery plate being movable away from said fingers to remove said strips from contact with said fingers, means for moving said delivery plate away from said fingers, and cutting elements positioned above said fingers for trimming the ends of the dough strips after they leave said receiving plate.

10. In a pretzel twisting machine, a feeder for transferring straight strips of dough to a twisting mechanism, said feeder comprising: an inclined plate for receiving dough strips, a receiving plate adjacent to the lower edge of said inclined plate and having a plurality of spaced arresting fingers integrally connected thereto in perpendicular relationship to the plane thereof, the said fingers being arranged in a straight line across said receiving plate and projecting above said receiving plate for abuttingly engaging said dough strips so as to straighten them as they are received from said inclined plate, an inclined delivery plate having finger means in enmeshment with the fingers of said receiving plate and adapted for an upward vertical movement relative to the plane of said receiving plate above said fingers for delivering the dough strips from the receiving plate to said twisting mechanism said strips resting on both said receiving plate and the finger means of said delivery plate when in engagement with the first mentioned fingers, a plate pivotally mounted on a horizontal axis and having its lower edge disposed above said receiving plate whereby swinging movement of said pivotally mounted plate will cause engagement thereof with dough strips intermediate the first mentioned inclined plate and said receiving plate to divert them from said finger means, and a manually operable handle for swinging said pivotally mounted plate at the will of an operator.

11. In a pretzel twisting machine a feeder for transferring straight strips of dough to a twisting mechanism comprising an inclined dough receiving plate formed of two intercalated members over which a strip of dough will gravitate, stop means cooperating with said members at the intercalation of said members to arrest the gravitational movement of a strip of dough over said members, one of said members being movably mounted with respect to the other of said members for movement out of intercalated relation with the other of said members and out of cooperation with said stop means for removing a strip of dough from arrested position in contact with said stop means to advance said strip along said plate beyond said stop means.

12. In a pretzel twisting machine, a feeder for transferring straight strips of dough to a twisting mechanism, said feeder comprising: an inclined plate for receiving dough strips, a receiving plate spaced from the lower edge of said inclined plate and lying in a plane substantially normal to said inclined plate, said receiving plate having fingers along one edge with recesses therebetween, a support carried by said receiving plate, said support having upwardly extending fingers substantially in alignment with said fingers on the receiving plate, a delivery plate movably mounted in said machine and movable from a position in alignment with said receiving plate to a second inclined position above the fingers on said support, said delivery plate having fingers projecting from an edge thereof into the recesses in said receiving plate when both receiving and delivery plates are in alignment, and delivery mechanism for receiving dough strips after they fall from said delivery plate and delivering them to said twisting mechanism.

13. In a pretzel twisting machine, a feeder for transferring straight strips of dough to a twisting mechanism, said feeder comprising: an inclined plate for receiving dough strips, a receiving plate adjacent to and below the lower edge of said inclined plate and having a plurality of spaced arresting fingers integrally connected thereto in perpendicular relationship to the plane thereof, the said fingers being arranged in a straight line across said receiving plate and projecting above said receiving plate for abuttingly engaging said dough strips so as to straighten them as they are received from said inclined plate, an inclined delivery plate having finger means in enmeshment with the fingers of said receiving plate for delivering the dough strips from the receiving plate to said twisting mechanism, said strips resting on both said receiving plate and the finger means of said delivery plate when in engagement with the first-mentioned fingers, said delivery plate being movable away from said fingers of the receiving plate to remove said strip from contact with the first-mentioned fingers, and a manually operable device positioned adjacent the first-mentioned inclined plate and movable intermediate the latter plate and said receiving plate for diverting dough strips from said finger means.

References Cited in the file of this patent

UNITED STATES PATENTS

| | | |
|---|---|---|
| 1,142,533 | Schaetzel | June 8, 1915 |
| 1,957,135 | Fabian | May 1, 1934 |
| 2,026,526 | Gipe | Jan. 7, 1936 |
| 2,090,291 | Gipe | Aug. 17, 1937 |
| 2,114,951 | Young et al. | Apr. 19, 1938 |
| 2,295,246 | Weida | Sept. 8, 1942 |